Patented Sept. 7, 1948

2,448,996

UNITED STATES PATENT OFFICE 2,448,996

3 - (2' - METHYL PIPERIDINO) - PROPYL-p-n BUTOXY BENZOATE AND ACID ADDITION SALTS THEREOF

Samuel M. McElvain, Madison, Wis., and Thomas P. Carney, Indianapolis, Ind.

No Drawing. Application June 30, 1945, Serial No. 602,655

2 Claims. (Cl. 260—294)

1

This invention relates to organic chemical compounds, and is directed to a new substituted benzoic acid ester, and salts thereof.

By this invention there are provided new compounds, namely 3-(2'-methylpiperidino)-propyl p-n-butoxybenzoate, which may be represented by the following formula:

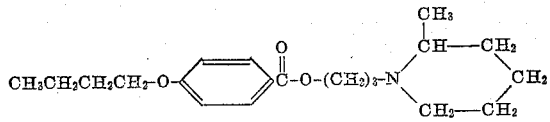

and acid addition salts thereof.

The compound in accordance with the above formula is a substituted benzoic acid ester and is a stable, water-insoluble, viscous oil at room temperature. The compound is basic in character and forms addition salts with acids.

Certain of the acid addition salts of the new 3-(2'-methylpiperidino)-propyl p-n-butoxybenzoate, such as the hydrochloride, hydrobromide, sulfate and phosphate, are white crystalline compounds which are readily water-soluble. Other acid addition salts, for example the picrate and the methylene-bishydroxynaphthoate, are stable, crystalline compounds with relatively low water-solubility.

Illustratively of the salts, the hydrochloric acid addition salt of 3-(2'-methylpiperidino)-propyl p-n-butoxybenzoate may be represented by the following formula:

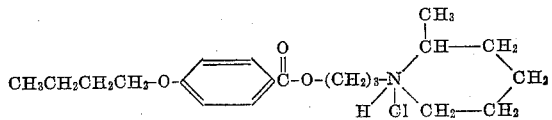

Compounds of the present invention have been found to be highly useful in therapeutics. Thus, for example, 3-(2'-methylpiperidino)-propyl p-n-butoxybenzoate hydrochloride has been found to be readily absorbed by mucous membranes producing an effective anesthesia of long duration. Furthermore, it is surprisingly well absorbed by scarified, abraded or burned skin and confers thereon a highly effective anesthesia of long duration, without irritation or toxic manifestations even when used on large areas, and the profundity of anesthesia is such as to permit necessary debridement without discomfort on the part of the patient. Additionally, fully effective relief from pain has been afforded by its use when applied to areas affected by severe sunburn.

The 3-(2'-methylpiperidino)-propyl p-n-butoxybenzoate of this invention may be prepared

2 by esterification methods. Thus for example, it may be prepared in the form of its hydrohalide salt by reacting, preferably in an inert solvent, a p-n-butoxybenzoyl halide with 3-(2'-methylpiperidino)-propyl alcohol. Additionally, it may be prepared as a hydrohalide salt by reacting p-n-butoxybenzoic acid with a 3-(2'-methylpiperidino)-propyl halide in a solvent such as isopropanol. For use in the above methods, the halide of choice is the chloride and when such halide is used, 3-(2'-methylpiperidino)-propyl p-n-butoxybenzoate is isolated as the hydrochloric acid salt. From the hydrochloride thus prepared, the free ester may be prepared by treatment with alkali.

Additional salts of 3-(2'-methylpiperidino)-propyl p-n-butoxybenzoate may be prepared by treating the ester with the appropriate acid. Furthermore, one salt of 3-(2'-methylpiperidino)-propyl p-n-butoxybenzoate may be converted to a different salt by treatment with the appropriate acid and preferential crystallization.

Specific examples further illustrating the preparation of compounds of this invention are as follows:

Example 1

3-(2'-methylpiperidino)-propyl p-n-butoxybenzoate hydrochloride may be prepared as follows:

55 g. of p-n-butoxybenzoic acid and 49.5 g. of 3-(2'-methylpiperidino)-propyl chloride are dissolved in 300 cc. of dry isopropanol and the mixture refluxed for about 12 hours. About half of the isopropanol is then distilled off and the residual solution cooled to about 0° C. 3-(2'-methylpiperidino)-propyl p-n-butoxybenzoate hydrochloride precipitates as a white crystalline compound. It is filtered off, washed once with ether and recrystallized from isopropanol. 3-(2'-methylpiperidino)-propyl p-n-butoxybenzoate hydrochloride thus prepared has been found to melt at about 147–149° C., and analysis has shown the presence of 9.61 percent chlorine as compared with a calculated value of 9.59 percent.

Example 2

3-(2'-methylpiperidino)-propyl p - n - butoxybenzoate may be prepared as follows:

7.0 g. of 3-(2'-methylpiperidino)-propyl p-n-butoxybenzoate hydrochloride are dissolved in 50 cc. of water and a solution of 0.8 g. of sodium hydroxide, dissolved in 10 cc. of water, is added thereto. The oily 3-(2'-methylpiperidino)-propyl p-n-butoxybenzoate which separates is taken up in ether, the ether solution separated and dried with potassium carbonate, and the ether evaporated, preferably in a vacuum, leaving the 3-(2'-methylpiperidino)-propyl p-n-butoxybenzoate as a residual colorless oil which may be further purified by distillation under reduced pressure.

*Example 3*

3-(2'-methylpiperidino)-propyl p-n-butoxybenzoate hydrochloride may also be prepared as follows:

To a refluxing solution of 12 g. of 3-(2'-methylpiperidino)-propyl alcohol dissolved in 70 cc. of dry benzene are added 15.2 g. of p-n-butoxybenzoyl chloride over a period of about ½ hour. The solution is refluxed for a period of about two hours after the p-n-butoxybenzoyl chloride addition has been completed, and is then cooled. The 3-(2'-methylpiperidino)-propyl p-n-butoxybenzoate hydrochloride which has crystallized during the cooling period is filtered off and washed with ether. It is further purified by recrystallization from isopropanol. 3-(2'-methylpiperidino)-propyl p-n-butoxybenzoate hydrochloride thus prepared has been found to melt at 147–149° C.

It may be noted that the compounds of this invention also may be prepared by processes of trans-esterification, condensation and replacement.

We claim:

1. 3-(2'-methylpiperidino)-propyl p-n-butoxybenzoate represented by the following formula

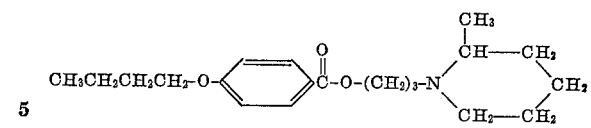

and its acid addition salts.

2. 3-(2'-methylpiperidino)-propyl p-n-butoxybenzoate hydrochloride represented by the formula

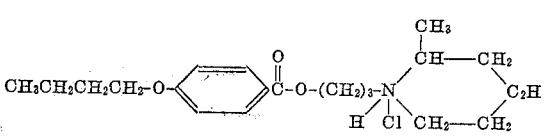

SAMUEL M. McELVAIN.
THOMAS P. CARNEY.

REFERENCES CITED

The following references are of record in the file of this patent:

UNITED STATES PATENTS

| Number | Name | Date |
| --- | --- | --- |
| 1,784,903 | McElvain | Dec. 16, 1930 |

OTHER REFERENCES

Archiv der Pharmazie und Berichte der Deustschen Pharmazeutischen Gesellschaft, vol. 278, pp. 425–437 (1940).